Figure 1:
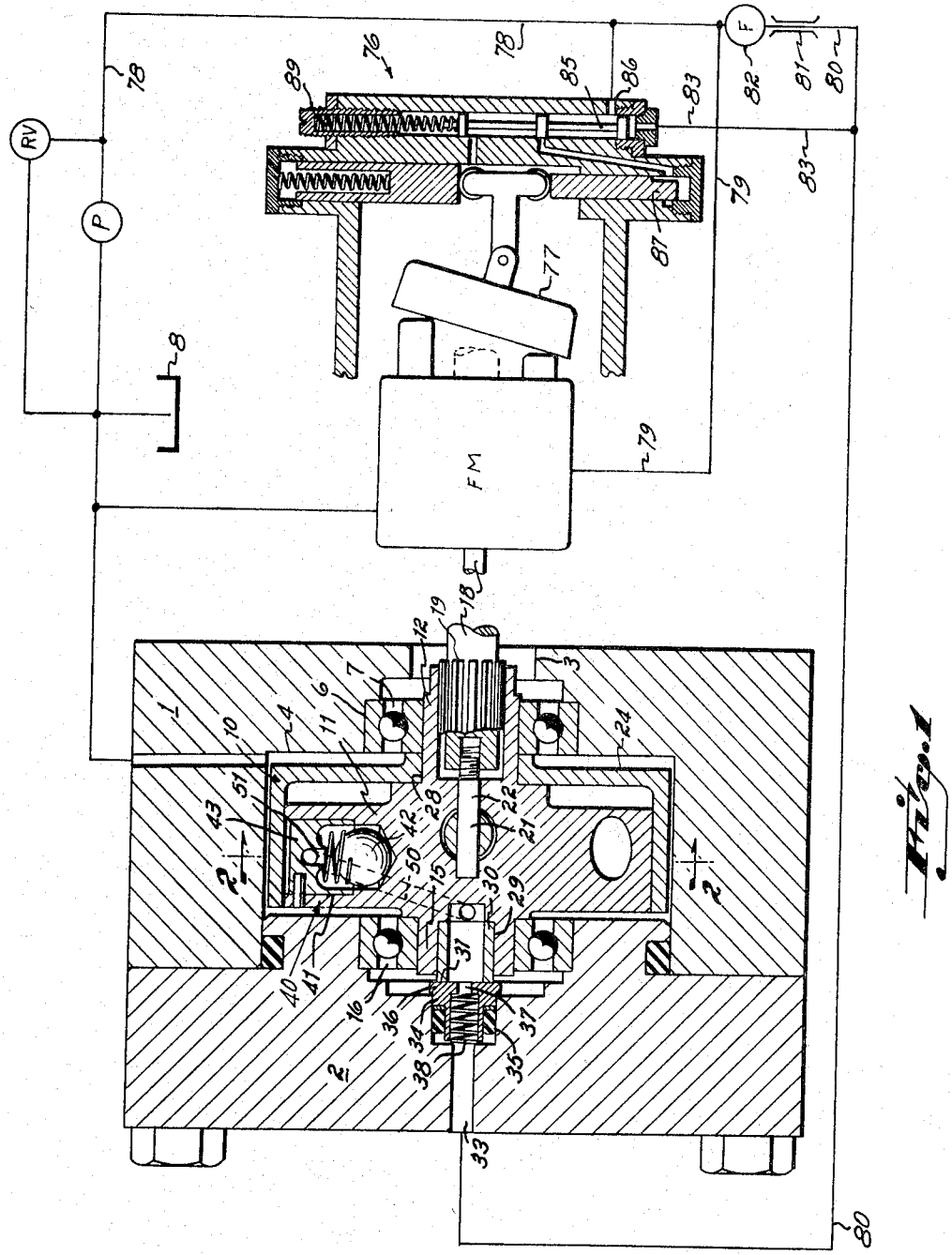

Nov. 1, 1966 C. A. KUBILOS 3,282,278
MULTIPLE CONDITION SPEED CONTROL
Filed Sept. 6, 1963 2 Sheets-Sheet 1

INVENTOR.
Charles A. Kubilos
BY
Wood, Herron & Evans
ATTORNEYS

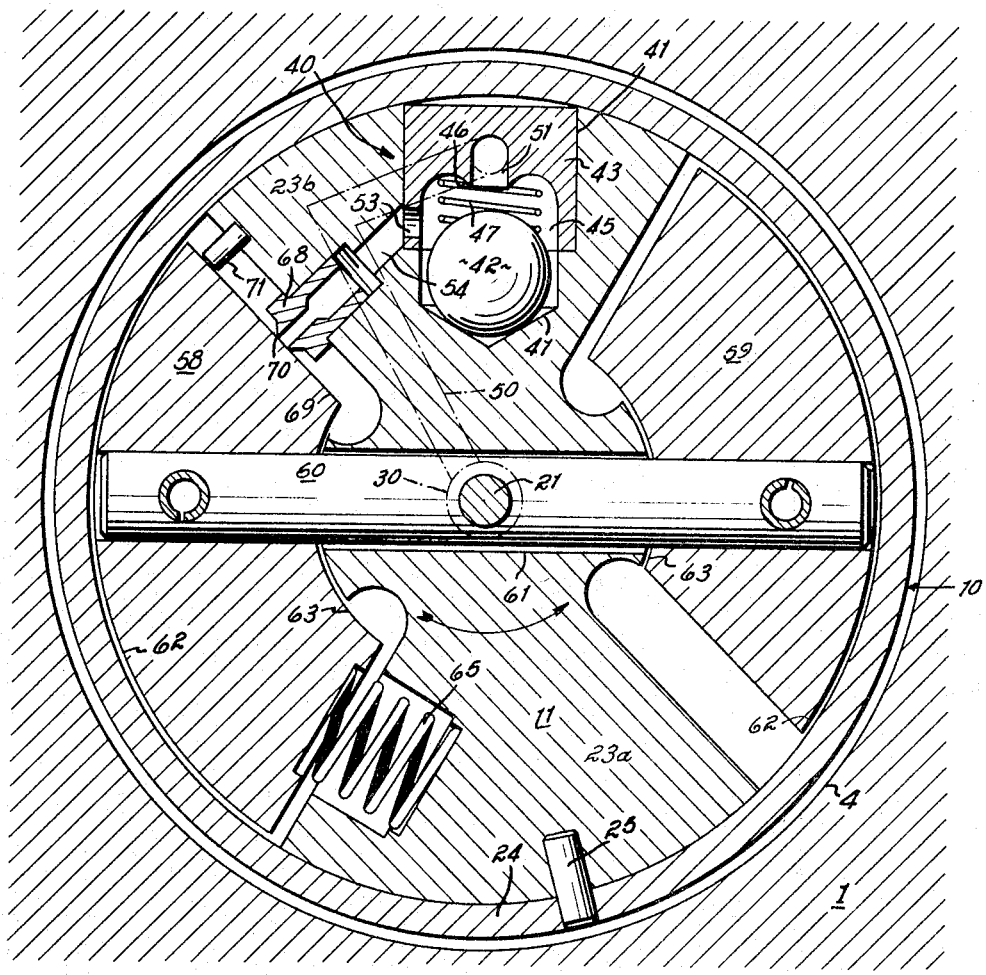

United States Patent Office 3,282,278
Patented Nov. 1, 1966

3,282,278
MULTIPLE CONDITION SPEED CONTROL
Charles A. Kubilos, Oxnard, Calif., assignor to Abex Corporation, a corporation of Delaware
Filed Sept. 6, 1963, Ser. No. 307,158
4 Claims. (Cl. 137—26)

This invention relates to means for controlling or governing the speed of rotation of a rotary hydraulic motor.

It has been an objective of the inventor to provide means utilizing hydraulic pressure as a control signal for governing the speed of rotation of a hydraulic pressure driven motor.

It has been another objective of the inventor to provide a hydraulic speed control displaying improved stability of operation and less tendency to oscillate about the set speed.

In accordance with this invention, hydraulic means rotated by the motor whose speed is to be controlled supplies a pressure signal that is utilized to control the displacement of the motor or of the pump driving the motor. More specifically, the speed control produces a single pressure signal which varies in accordance with both the rate of rotation of the motor and with the rate of change of rotation of the motor, and this signal is used to operate motor speed changing means.

The speed control means include two independently operating variable orifices or flow restricting nozzles through which hydraulic fluid flows sequentially from a source of pressure. The open area of one of these nozzles is adjusted or varied according to the speed of the rotation of the motor, and the flow of fluid through that nozzle establishes a pressure differential which also varies with the speed of rotation. The other nozzle is varied in accordance with the acceleration or deceleration of the motor, and establishes a differential or drop in the pressure of fluid flowing through it that varies according to the rate of change of motor speed. The nozzles are arranged so that the pressure drops are added, and their sum is applied to the displacement varying means of the motor to change the volume of fluid flowing through the motor per revolution, or to displacement varying means of the pump serving the motor, and thereby changes the speed of the motor.

The speed sensing or speed responsive orifice preferably comprises a ball which is movable radially in a rotary member driven by the motor and which, as motor speed increases, is urged with greater centrifugal force toward a port in the rotary member from which fluid flows. The greater the rate of rotation of the motor, the greater the centrifugal force urging the ball toward the port, and the greater the restriction the ball imposes on flow through the port.

The acceleration sensor, that is, the acceleration responsive variable orifice, preferably comprises a second fixed port which is rotated by the motor and a weight which is free to move circumferentially relative to that port. The weight is pivoted about the center of rotation of the port. Under constant speed conditions, the relationship of the weight and port is unchanging, but when the motor tends to accelerate or decelerate, the inertia of the weight causes it to move either closer to or farther from the port, thereby varying the restriction to flow through that port. Thus, pressure drops are established across each orifice which are independent in magnitude. These pressure drops are summed to provide a back pressure at the inlet to the first orifice which is used to control the motor speed changing means.

The invention is predicated in part upon the discovery that acceleration responsive orifice means of the type described are surprisingly effective to stabilize the operation of the speed control, and to reduce its tendency to hunt or oscillate about a set speed.

The further details of the invention can best be described with reference to the drawings.

In the drawings,

FIGURE 1 is an axial section through a preferred form of speed control means incorporating the principles of this invention, and illustrates diagrammatically a hydraulic system in which the speed control is connected to govern the speed of a variable stroke piston type fluid motor; and FIGURE 2 is a transverse section taken on line 2—2 of FIGURE 1.

The speed control includes a housing comprising a main body section 1 and an end cap 2 secured to the main body section by means such as the bolts shown. The body section 1 has a bore 3 which extends into an internal chamber 4 in which rotating mechanism to be described is contained. The end cap 2 closes the chamber 4. The bore 3 is enlarged as at 6, adjacent chamber 4, and receives the outer race of a ball bearing assembly 7. This chamber 4 is connected to a fluid reservoir or tank 8.

Rotating mechanism designated generally by 10 is enclosed within chamber 4, and this mechanism 10 includes a flywheel or rotor 11 having axial projections 12 and 15 on its opposite faces, as seen in FIG. 1. Projection 12 extends into bore 3 and is journalled in the inner race of the ball bearing assembly 7. Axial projection 15 on the opposite rotor face is journalled in the inner race of a second ball bearing assembly 16. The outer race of ball bearing assembly 16 is received in a recess formed in end cap 2.

An operating shaft 18 is splined to the axial projection 12 of rotor 11, as at 19. This shaft 18 is connected to or driven by the rotary fluid motor whose speed is to be controlled, indicated diagrammatically at FM in FIGURE 1.

Shaft 18 has an axial extension 21 threaded into its inner end, and this extension 21 projects into a bore 22 in rotor 11.

As shown in FIGURE 2, rotor 11 is preferably in the general shape of a bow tie in transverse section, that is, it is formed with diametrically opposed symmetric sectors 23a and 23b. It is encased or shrouded within a cup-shaped shell 24 to reduce fluid friction resulting from its rotation in chamber 4. Shell 24 and rotor 11 are pinned together as at 25. Shell 24 has a central opening or bore 28 which is fitted closely to the projection 12 of rotor 11.

On the opposite side of rotor 11, i.e. on the left in FIGURE 1, means are provided for introducing fluid under pressure through a rotating seal into passages in the rotor. An axial bore 29 is formed in axial projection 15, and this bore 29 is fitted with an annular insert 30 the outer end face 31 of which projects beyond the projection.

An inlet port or passage 33 is formed in end cap 2 and communicates axially with the interior of insert 30 in the rotary mechanism 10. An axially slidable plug 34 is disposed in the inner end of this port 33, adjacent insert 30, and is sealed to the end cap by an O-ring 35. This plug 34 has a through bore 37 the inner or right end 36 of which is planar and is facially engaged with the end surface 31 of insert 30 in the rotary mechanism. A coil compression spring 38 urges plug 34 into engagement with insert 30 so that a seal is maintained between the abutting faces 36 and 31 as the rotor 11 turns relative to plug 34. Thus, fluid introduced into port 33 is supplied through the rotating seal into the interior of insert 30.

In one sector 23b of the rotor 11 speed sensor or speed responsive means are provided which are operative to establish a pressure differential that varies in accordance with the rate of rotation of the rotor. These speed sensor means, designated generally by 40, are conveniently mounted in a radial bore 41 in rotor 11. A spherical ball 42 resides in this bore 41, and the outer end of the bore is closed by an inverted generally cup-shaped plug 43 which is pinned in place and which is sealed to the bore. Plug 43 has an internal chamber 45 (see FIGURE 2) the diameter of which is somewhat greater than the diameter of ball 42, and this chamber is shaped to define a sharp circular edge 46 around an inlet port 51 through which fluid flows into chamber 45. A light spring 47 is preferably used to urge ball 42 away from edge 46. A passage 50, indicated by chain-dashed lines in FIGURES 1 and 2, extends in rotor 11 from the inner end of bore 29 to inlet port 51 in plug 43. Together, ball 42 and edge 46 form a speed responsive variable orifice or nozzle.

Plug 43 has a port 53 communicating from chamber 45 to a bore 54 in rotor 11. Bore 54 leads to a side or radially extending face of the rotor.

A pair of balanced, generally symmetrical arcuate segments or weights 58 and 59 are pinned to opposite ends of a bar 60 which passes through a transverse opening 61 in rotor 11. This bar 60 is pivoted on operating shaft extension 21 for rotation relative to the rotor. A small clearance is provided between the rounded outer surfaces 62, 62 of the weights 58 and 59 and inner surface of surrounding shell member 24. Similarly, clearance is provided between the inner surfaces 63, 63 of the weights 58 and 59 and rotor 11. A spring 65 urges the weights 58 and 59 and bar 60 clockwise about shaft 21, thus urging weight 58 toward bore 54 in the rotor 11.

Acceleration sensor mechanism is provided for establishing a pressure differential which varies according to the rate of change of rotation of the rotor, i.e. with the acceleration or declaration of the shaft 18. This mechanism comprises an adjustable throttling orifice or nozzle which is defined between an insert or port 68 in bore 54 of the rotor and the adjacent radial edge surface 69 of segment 58. Port 68 has a bore extending through it and communicating with bore 54, and has a sharp annular edge 70 surrounding the outer end of this bore. This sharp edge 70 forms an adjustable valve or orifice with the surface 69 of segment 58. It is preferable that one or more stops 71 be formed on the rotor to protect the sharp edge 70 from damage caused by impacts between it and the surface 69.

In operation, when a source of pressure is connected to port 33 and shaft 18 is driven in counterclockwise direction with reference to FIGURE 2, fluid flows from port 33 through the speed sensing nozzle, then through the acceleration sensing nozzle, and is returned from chamber 4 to tank 8. A pressure drop occurs across each nozzle. The pressure at port 33 is equal to the sum of these two pressure differentials, one of which is proportional to the square of speed and the other of which is independent of the first and is proportional to acceleration. It is the speed related pressure differential which primarily governs the rate of rotation of the motor controlled by the device, whereas the acceleration responsive pressure differential is primarily employed to prevent hunting and to stabilize the operation of the speed control.

More specifically, as shaft 18 is rotated, centrifugal force urges ball 42 radially outwardly against the pressure of fluid at port 51, restricting the flow through the orifice defined between ball 42 and edge 46. A pressure differential across the orifice is established in response to flow through this restriction, the magnitude of which is proportional to the square of the speed of rotation of the device. In other words, the drop between the pressure of fluid at port 51 and in chamber 45 is proportional to the speed of rotation squared. It has been found that spring 47 helps to stabilize the operation of this orifice. From chamber 45, the fluid flows through port 53 and into bore 54.

The clearance between radial surface 69 of segment or weight 58 and edge 70 is such that at a constant speed of rotation the pressure drop across the nozzle 69, 70 balances the preload of spring 65. This drop is constant at constant speed, regardless of what the actual speed is. However, when the motor accelerates, the inertia of weight 58, which is pivoted for rotation about the center of rotation of the rotor, causes it to move closer to edge 70, decreasing the area of orifice 69, 70, whereby the pressure differential resulting from flow through that orifice is increased, in order to provide the force necessary to accelerate the segment 58. This pressure drop is independent of but is added to the pressure drop occurring across the speed responsive nozzle 42, 46. From the acceleration responsive nozzle the fluid flows into the space between the shell 24 and rotor 11, into the chamber 4, and is drained to tank.

Thus, when speed increases both the speed sensor and the acceleration sensor establish higher upstream pressures, which, because the sensors are in series, add together to establish an increased pressure at port 33. It should also be noted that the pressure in port 33 is higher at higher rotor speeds, even when acceleration is zero.

The pressure so established in port 33 may be used to operate a conventional pressure actuated control valve or compensator for changing displacement, and therefore motor speed, in accordance with the pressure. In FIGURE 1 there is shown diagrammatically a system including a constant volume pump and a variable stroke piston motor, the speed of which is adjusted by conventional hydraulic means which are operated by the pressure at port 33. The displacement per revolution of motor FM is controlled by an angularly adjustable hanger 77 which is operated by a hanger positioner or compensator of known type, shown at 76. The motor illustrated in this system is a piston type motor but could be a vane or other type of variable displacement motor. The main drive shaft of the motor, shown in dotted lines, passes through the center of the hanger 77. The motor also drives shaft 18 of the speed control.

The motor FM is supplied with fluid from a constant pressure source represented in FIGURE 1 by a fixed volume pump P and a relief valve RV. In applications involving higher power, a pressure compensated variable stroke pump might be used as the pressure source. Pump P is connected to the motor through lines 78 and 79. The pump is connected to port 33 of the speed control from line 78 through a line 80 which includes a flow restrictor 81. For a given input pressure in line 78, the restrictor 81 acts to establish a substantially constant flow into line 80. This constant flow, through the variable orifices 42, 46, and 69, 70, produces the control pressure variation. Line 80 also includes a suitable filter, indicated at 82, for removing particles of dirt or grit in the fluid entering the speed control.

The pressure maintained at port 33 by the speed control is applied through lines 80 and 83 to the end of a pressure operated spring balanced spool 85 of the compensator mechanism 76. Pump P is connected to the inlet port 86 of the compensator 76 for supplying fluid to change the position of the hanger 77, depending upon the position of the spool 85 as determined by the pressure in lines 80 and 83.

As the motor FM accelerates, both the pressure drop across nozzle 42, 46, and that across nozzle 69, 70, increase, so that the pressure at port 33, equal to their sum, increases. This increase in pressure is reflected backwardly through line 80 and is applied to the end of the spool 85 of the compensator. When the hydraulic force acting on the end of the compensator spool exceeds the force of the balancing compensator spring 89, spool 85 is shifted to permit fluid to flow from the pump to the end of the hanger positioner piston 87. The piston 87 is thereby shifted to decrease the angle of hanger 77. Because the system shown is a constant input pressure system, motor speed is controlled by matching the output torque of the motor FM to the load torque. The motor output torque is approximately proportional to the angle of hanger 77. When the motor speed is high or when the motor is accelerating, pressure in line 83 is increased, as previously explained, and this pressure moves spool 85 to port high pressure to piston 87. Piston 87 then moves in the upward direction, with reference to FIGURE 1, decreasing the angle of hanger 77 and therefore reducing output torque. Since the torque load exceeds output torque, the motor FM slows down. The compression of spring 89 is adjustable, and determines the motor speed which is to be maintained.

A decrease in motor speed below the value determined by the setting of spring 89 reduces the pressure acting on the end of spool 85 and the spool 85 is moved to release pressure acting on hanger positioner piston 87, permitting the hanger to move in a direction increasing motor displacement per revolution and therefore increasing output torque. Since output torque is now higher than load torque, the motor speed increases. Under steady speed conditions, as shown in FIGURE 1, the pressure established by the speed control balances the force of spring 89 and fluid flows neither into nor out of the chamber at the end of piston 87.

As previously mentioned, the acceleration sensor stabilizes the operation of the entire speed control. For example, if the load on the motor suddenly increases, rate of change of motor speed may be large in relation to the actual change in speed, and the acceleration sensor produces a large immediate change in pressure at port 33 to increase motor speed. At the same time, the speed sensor also produces change in the pressure, which further increases motor speed. In the absence of the acceleration sensor, the speed control is slower acting and tends to cause oscillation of the motor above and below set speed.

It will be appreciated that the speed control can equally well be applied to a fixed stroke motor which receives flow from a variable stroke pump. In this case the speed control governs the pump hanger position.

One of the advantages of the speed control construction described is that it is relatively insensitive to leakage in the rotating seal and to variations in the supply pressure. It will be seen also that the centrifugal force is utilized directly, without mechanical linkage, to generate a balancing pressure which is proportioned to the square of motor speed. The pressure so generated is therefore not subject to error from linkage friction and, moreover, can be used for control at some distance from the rotating member. The acceleration responsive means also operates without any mechanical linkage and associated friction. By combining the speed sensor and acceleration sensor in series relation, a single pressure output is provided, which is the sum of one factor proportional to speed squared and a second factor which is proportional to acceleration. This pressure signal provides the feedback necessary for a fast acting, stable system.

While the speed control of this invention has been described herein in reference to a preferred construction, it will be realized that principles of the invention are not limited to that form alone but include modifications and variations thereof within the scope of the following claims.

What is claimed is:

1. A speed control for a rotary device controllable by hydraulic pressure changes, comprising
   a hollow body,
   a circular cup-shaped element journalled for rotation in said body,
   a rotor having generally symmetrical opposed sectors and secured within said cup-shaped element for rotation therewith,
   a shaft coupled to rotate said rotor and cup-shaped element in said body in proportion to the speed of said rotary device,
   a chamber formed in one sector of said rotor,
   passage means within said rotor for introducing pressure fluid into said chamber,
   a radially inward facing seat through which said fluid enters said chamber,
   a ball valve member within said chamber forming a speed responsive variable orifice with said seat under the effect of centrifugal force when said cup-shaped element and rotor are rotated,
   a bore transverse to the axis of said rotor extending therethrough crosswise to said sectors,
   a bar passing through said bore and journalled on said shaft for limited rotation thereon,
   a pair of balanced arcuate segments mounted to the respective ends of said bar for rotation therewith,
   said segments being generally symmetrical to the sectors of said rotor and being disposed between said sectors within said cup-shaped element,
   a passage leading from said chamber through said rotor to a port on one of said sectors, said port lying in a radial plane,
   a segment opposite to said port presenting a surface forming an acceleration responsive variable orifice with said port,
   spring means between said rotor and one of said segments tending to close said acceleration responsive variable orifice,
   and outlet means for the interior of said cup-shaped element.

2. The speed control of claim 1 wherein said rotor has portions projecting axially beyond the opposite sides of said cup-shaped element, said portions being journalled in said body,
   and further wherein pressure fluid is supplied to said chamber from an axial passage in one of said portions.

3. The speed control of claim 1 wherein said cup-shaped element has a cylindrical shell surrounding said sectors and segments and wherein the peripheries of said sectors are in facial engagement with the inner surface of said shell,
   and further wherein said segments are arcuate sections defined within an annulus having a center lying on the axis of said shaft.

4. A speed control for a rotary hydraulic motor comprising,
   a body having a circular cavity therein,
   a hollow cylindrical casing rotatable within said cavity,
   a rotor within said casing and mechanically secured to said casing for rotation therewith in said cavity,
   a shaft in said body connected to at least one of said rotor and casing for rotating the same together in said cavity,
   first and second ports provided by said rotor,
   passage means for introducing pressure fluid through said body to flow sequentially through said ports to an outlet in said body,
   radially movable means associated with one of said ports forming a variable orifice therewith responsive to the rate of rotation of said rotor for establishing a pressure drop across said orifice in accordance with said rate,
   circumferentially movable means associated with the other of said ports forming a variable orifice therewith responsive to changes in the rate of rotation of said rotor for establishing a pressure drop across said orifice in accordance with said changes, said circumferentially movable means being mounted for rotation relative to said rotor and casing about the axis of said rotor and being circumferentially surrounded by said casing.

References Cited by the Examiner

UNITED STATES PATENTS

| | | | |
|---|---|---|---|
| 1,509,695 | 9/1924 | Volet | 137—26 X |
| 2,406,087 | 8/1946 | Mallory | 137—56 |
| 2,474,203 | 6/1949 | Sparrow | 137—26 X |
| 2,630,815 | 3/1953 | Worthing | 137—48 |
| 2,633,830 | 4/1953 | McCourty | 137—48 X |
| 2,702,560 | 2/1955 | Bobier | 137—48 |
| 2,941,538 | 6/1960 | Quinby | 137—48 |
| 3,085,397 | 4/1963 | Jubb | 137—26 X |

WILLIAM F. O'DEA, *Primary Examiner.*

CLARENCE R. GORDON, *Examiner.*